United States Patent [19]

Chiao

[11] Patent Number: 4,656,229
[45] Date of Patent: Apr. 7, 1987

[54] ANAEROBIC ADHESIVE COMPOSITIONS

[75] Inventor: Wen B. Chiao, Bridgewater, N.J.

[73] Assignee: National Starch and Chemical Corporation, Bridgewater, N.J.

[21] Appl. No.: 804,968

[22] Filed: Dec. 2, 1985

[51] Int. Cl.$^4$ ............................................. C08L 61/20
[52] U.S. Cl. .................................. 525/518; 156/331.3; 428/460
[58] Field of Search ....................... 525/518, 127, 162; 156/327, 331.3; 526/46; 428/460

[56] References Cited

U.S. PATENT DOCUMENTS

| 3,591,438 | 7/1971 | Toback et al. | 156/310 |
| 3,616,040 | 10/1971 | Toback | 156/310 |
| 3,880,956 | 10/1973 | Skoultchi | 260/89.5 R |
| 3,890,407 | 6/1975 | Briggs et al. | 260/878 R |
| 4,106,971 | 8/1978 | Briggs et al. | 156/310 |
| 4,136,102 | 1/1979 | Crivello | 260/440 |
| 4,182,644 | 1/1980 | Briggs et al. | 156/310 |

OTHER PUBLICATIONS

"Diaryliodonium Salts, A New Class of Photoinitiators for Cationic Polymerization", by J. V. Crivello and J. H. W. Lam; Macromolecules, vol. 10, No. 6, pp. 1307–1315, (1977).

Primary Examiner—Theodore E. Pertilla
Attorney, Agent, or Firm—Edwin M. Szala; Ellen T. Dec

[57] ABSTRACT

Two-part anaerobic adhesives and articles bonded therewith are disclosed. The adhesives comprise a first part component of free radical initiated polymerizable acrylic monomer(s) and a diaryl iodonium salt. A second part comprises a condensation reaction product of an aldehyde and a primary or secondary amine. The described curable adhesives are formed just prior to use where the second part containing the activator is brought in contact with the first part. Both the first part and second part component exhibit a high degree of stability when stored separately.

15 Claims, No Drawings

ANAEROBIC ADHESIVE COMPOSITIONS

BACKGROUND OF THE INVENTION

1. Field of Invention

This invention relates to fast curing, two part anaerobic adhesives and to articles bonded therewith. The curable adhesives described herein comprise a first part component of free radical initiated polymerizable acrylic monomer(s) and a diaryl iodonium salt. A second part, which is brought in contact therewith just prior to use, comprises a condensation reaction product of an aldehyde and a primary or secondary amine to induce the free radical decomposition of the diaryl iodonium salt.

2. Description of the Prior Art

Disclosed in the prior art are many curable adhesive compositions which cure or set by free radical polymerization of ethylenically unsaturated polymerizable monomers. The prior art relative to curable adhesives discloses free radical initiators which are of the organic peroxy or hydroperoxy type including peresters or peracids. Especially useful are the peresters and peroxides such as t-butyl perbenzoate and cumene hydroperoxide. Also disclosed in the prior art are curing adhesive compositions employing aldehyde-amine condensation reaction products as free radical accelerators and primers for these peroxy compounds. Also disclosed in the prior art are anaerobic curing adhesive compositions employing diazonium salts as latent polymerization catalysts.

U.S. Pat. No. 3,591,438 to Toback et al is directed to adhesive compositions containing a mixture of a polymerizable acrylate ester monomer and a peroxy polymerization initiator employed with a primer comprising a mixture of an aldehydeamine condensation product and a reducing activator selected from the group consisting of defined sulfur containing free radical accelerators and compounds containing an oxidizable transition metal.

U.S. Pat. No. 3,616,040 to Toback discloses peroxyinitiated cure of acrylate based compositions where the cure is accelerated by use of a condensation reaction product of an aldehyde and a primary or secondary amine.

U.S. Pat. Nos. 3,890,407 and 4,106,971, both to Briggs et al, disclose employment of a condensation reaction product of an aldehyde and a primary or secondary amine to cure adhesive compositions comprising a solution of chlorosulfonated polyethylene or mixtures of sulfonyl chlorides and chlorinated polymers in polymerizable vinyl monomers. Other ingredients such as an organic salt of a transition metal, a peroxy compound and a tertiary amine may also be included in the adhesive compositions.

U.S. Pat. No. 4,182,644 to Briggs et al discloses use of a condensation reaction product of an aldehyde and a primary or secondary amine to accelerate the cure of adhesive compositions comprising a polymer, a monomer, and a free-radical generator derived from an organic sulfonyl chloride and/or a chlorosulfonated polymer.

U.S. Pat. No. 3,880,956 to Skoultchi discloses anaerobic curing compositions comprising mixtures of polymerizable acrylic and substituted acrylic monomers and diazonium salts as latent polymerization catalysts therefor. The invention is directed to anaerobic, one part adhesives.

There is a recognized need in the adhesive art for adhesives which are stable to heat and stable to storage for periods of at least six months. On use subsequent to storage, however, the cure of the adhesive must be rapid providing strong bonds within a short period of time. In the present invention the diaryl iodonium salts provide heat and storage stability to the adhesives comparable to adhesives employing peroxy or hydroperoxy systems. Typical fast curing adhesives can be formulated to remain stable, i.e., not cure or lose reactivity, for periods of six months to one year. The invention provides a versatility in formulating a variety of stable adhesives having a slow, moderate (about 60–120 seconds) or fast (about 45–60 seconds) cure useful in specific end-use applications.

SUMMARY OF THE INVENTION

In accordance with the present invention, stable, curable anaerobic adhesives can be formulated based on the free radical initiated cure of adhesive acrylic monomers employing a diaryl idonium salt in the presence of an aldehyde-amine condensation reaction product. The adhesives are stable (prior to combining of the two parts) and can exhibit a fast cure and strong bonds.

The two part adhesives herein comprise a first part (monomer base component) formed of free radical polymerizable acrylic or substituted acrylic monomer(s), as later described, together with diaryl iodonium salt(s) in an amount sufficient to initiate polymerization, ordinarily from about 0.1 to 10% based on the weight of the monomer(s). A second part comprises an activator which functions to induce decomposition of the selected salt to produce free-radicals. The activators herein are selected from the condensation reaction products of aldehydes and primary or secondary amines. The adhesives are formed just prior to use where the second part containing the activator is placed in contact with the first part. In forming the adhesive the activator component is usually applied as a primer or coating to the substrate to be bonded. The monomer component can be applied either to the surface which has been treated with the activator or to the appropriate uncoated mating surface. Alternatively, the two parts may be combined (mixed) together in suitable proportions just prior to application.

The activator condensation product may be used on an "as is" basis or it may be dissolved in a suitable solvent. In some applications, the solvent may include an acrylic or methacrylic monomer and/or include a propellant thereby permitting application of the activator by aerosol spraying of the substrate. Suitable volatile solvents include 1,1,1-trichloroethane and methylchloroform. Representative monomers which may be used in the activator component include isobornyl methacrylate, tetrahydrofurfuryl methacrylate and cyclohexyl methacrylate. Monomers containing hydroxyl or carboxyl groups such as, for example, hydroxyethyl methacrylate or methacrylic acid are incompatible with the present activators and may polymerize spontaneously.

DETAILED DESCRIPTION OF THE PRESENT INVENTION

One class of polymerizable monomers useful in the present compositions correspond to the general formula:

$$\text{H}_2\text{C}=\overset{\underset{|}{R'}}{\text{C}}-\overset{\underset{}{\text{O}}}{\overset{||}{\text{C}}}-\text{O}-(\text{CH}_2)_m-\left[\left(\overset{\underset{|}{R''}}{\overset{|}{\text{C}}}\right)_p\overset{\underset{|}{\text{H}}}{\overset{|}{\text{C}}}-\text{O}-\overset{\underset{}{\text{O}}}{\overset{||}{\text{C}}}-\overset{\underset{|}{R'}}{\text{C}}=\text{CH}_2\right]_n \quad (a)$$

wherein

R is selected from the group consisting of hydrogen methyl, ethyl, $$-\text{CH}_2\text{OH} \quad \text{and} \quad -\text{CH}_2-\text{O}-\overset{\underset{}{\text{O}}}{\overset{||}{\text{C}}}-\overset{\underset{|}{R'}}{\text{C}}=\text{CH}_2;$$

R' is selected from the group consisting of hydrogen, chlorine, methyl and ethyl;

R" is selected from the group consisting of hydrogen, hydroxy, and $$-\text{O}-\overset{\underset{}{\text{O}}}{\overset{||}{\text{C}}}-\overset{\underset{|}{R'}}{\text{C}}=\text{CH}_2;$$

m is an integer equal to at least 1, e.g. from 1 to 8 or higher and preferably from 1 to 4 inclusive;

n is an integer equal to at least 1, e.g. from 1 to 20 or more; and p is one of the following: 0 or 1.

Monomers useful in this invention and which come within the above general formula include, for example, ethylene glycol dimethacrylate, ethylene glycol diacrylate, polyethylene glycol diacrylate, tetraethylene glycol dimethacrylate, diglycerol diacrylate, diethylene glycol dimethacrylate, and other polyether diacrylates and dimethacrylates.

The above class of monomers is in essence described in U.S. Pat. No. 3,043,820 issued July 10, 1962 (to R. H. Krieble).

A second class of polymerizable monomers useful in the present compositions correspond to the general formula:

$$\text{H}_2\text{C}=\overset{\underset{|}{R}}{\text{C}}-\overset{\underset{}{\text{O}}}{\overset{||}{\text{C}}}-\text{O}(-R'-\text{O})_n\overset{\underset{}{\text{O}}}{\overset{||}{\text{C}}}-R''-\overset{\underset{}{\text{O}}}{\overset{||}{\text{C}}}(-\text{O}-R')_n\text{O}-\overset{\underset{}{\text{O}}}{\overset{||}{\text{C}}}-\overset{\underset{|}{R}}{\text{C}}=\text{CH}_2 \quad (b)$$

wherein

R represents hydrogen, chlorine, methyl or ethyl,

R' represents alkylene with 2–6 carbon atoms,

R" represents $(\text{CH}_2)_m$ in which m is an integer of from 0 to 8,

[phenyl-o,m,p], $\overset{\text{H}}{\underset{\text{H}}{\text{C}}}=\overset{}{\underset{\text{H}}{\text{C}}}$ , $\overset{\text{H}}{\underset{\text{H}}{\text{C}}}=\overset{\text{H}}{\underset{}{\text{C}}}$ , $\overset{}{\underset{\text{H}}{\text{C}}}=\overset{\text{CH}_3}{\underset{\text{CH}_3}{\text{C}}}$ or $\overset{}{\underset{\text{H}}{\text{C}}}=\overset{\text{CH}_3}{\underset{}{\text{C}}}$, and n represents an integer of from 1 to 4.

Typical monomers of this class include, for example, dimethacrylate of bis(ethylene glycol) adipate, dimethacrylate of bis(ethylene glycol) maleate, dimethacrylate of bis(diethylene glycol) phthalate, dimethacrylate of bis(tetraethylene glycol) phthalate, dimethacrylate of bis(tetraethylene glycol) sebacate, dimethacrylates of bis(tetraethylene glycol) maleate, and the diacrylates and chloroacrylates corresponding to said dimethacrylates, and the like.

The above class of monomers is in essence described in U.S. Pat. No. 3,457,212 issued July 22, 1969 (Sumitomo Chemical Company, Ltd.).

Also useful herein are monomers which are isocyanatehydroxyacrylate or isocyanate-aminoacrylate reaction products which may be characterized as acrylate terminated polyurethanes and polyureides or polyureas. These monomers correspond to the general formula:

$$\left[\text{A}-\text{X}-\overset{\underset{}{\text{O}}}{\overset{||}{\text{C}}}-\text{NH}\right]_n-\text{B} \quad (c)$$

wherein

X is selected from the group consisting of $$-\text{O}- \quad \text{and} \quad -\overset{\underset{|}{R}}{\text{N}}-,$$

and

R is a member selected from the group consisting of hydrogen and lower alkyl of 1 to 7 carbon atoms;

A represents the organic residue of an active hydrogen containing acrylic ester wherein the active hydrogen has been removed, the ester being hydroxy or amino substituted on the alkyl portion thereof and the methyl, ethyl and chlorine homologs thereof;

n is an integer from 1 to 6 inclusive; and

B is a mono- or polyvalent organic radical selected from the group consisting of alkyl, alkylene, alkenyl, cycloalkyl, cycloalkylene, aryl, aralkyl, alkaryl, poly(oxyalkylene), poly(carboalkoxyalkylene), and heterocyclic radicals both substituted and unsubstituted.

Typical monomers of this class include the reaction product of mono- or polyisocyanate, for example, toluene diisocyanate, with an acrylate ester containing a hydroxy or amino group in the non-acrylate portion thereof, for example, hydroxyethyl methacrylate.

The above class of monomers is in essence described in U.S. Pat. No. 3,425,988 issued Feb. 4, 1969 (Loctite Corp).

Another class of monomers useful in the present application are the mono- and polyacrylate and methacrylate esters of bisphenol type compounds. These monomers may be described by the formula:

where
R¹ is methyl, ethyl, carboxyl or hydrogen;
R² is hydrogen, methyl or ethyl;
R³ is hydrogen, methyl or hydroxyl;
R⁴ is hydrogen, chlorine, methyl or ethyl and
n is an integer having a value of 0 to 8.

Representative monomers of the above-described class include: dimethacrylate and diacrylate esters of 4,4'-bis-hydroxyethoxy-bisphenol A; dimethacrylate and diacrylate esters of bisphenol A; etc. These monomers are essentially described in Japanese Patent Publication No. 70-15640 (to Toho Chemical Manuf. Ltd.).

In addition to the monomers already described, other useful monomers are monofunctional acrylate and methacrylate esters and the hydroxy, amide, cyano, chloro, and silane substituted derivatives thereof. Such monomers include, for example, methyl acrylate, methyl methacrylate, ethyl acrylate, ethyl methacrylate, hydroxyethyl methacrylate, hydroxypropyl acrylate, hydroxypropyl methacrylate, butyl acrylate, n-octyl acrylate, 2-ethylhexyl acrylate, decylmethacrylate, dodecyl methacrylate, cyclohexyl methacrylate, tert.-butyl methacrylate, acrylamide, N-methylolacrylamide, diacetone acrylamide, N-tert.-butyl acrylamide, N-tert.-octyl acrylamide, N-butoxyacrylamide, gamma-methacryloxypropyl trimethoxysilane, 2-cyanoethyl acrylate, 3-cyanopropyl acrylate, tetrahydrofurfuryl chloroacrylate, glycidyl acrylate, glycidyl methacrylate, and the like.

The monomers useful herein are seen to be polymerizable monomers having one or more acrylic or substituted acrylic groups as a common, unifying characteristic, and for convenience may be generically termed acrylic and substituted acrylic monomers.

It is understood that the various monomers useful herein are not required to be in a highly purified state. The monomers may be comprised of commercial grades in which inhibitors, stabilizers, or other additives or impurities may be present, as well as those prepared in the laboratory or in pilot plant scale.

In preparing these curable compositions, it is within the scope of the present invention that the required acrylic monomer may be a mixture of acrylic monomers rather than a single acrylic monomer, and there may also be utilized, in combination therewith, other non-acrylic, ethylenically unsaturated copolymerizable comonomers such as unsaturated hydrocarbons, unsaturated esters and ethers, vinyl esters, and the like. Typical optional comonomers include: vinyl acetate, methyl vinyl ether, methyl vinyl ketone, poly(ethylene maleate), allyl alcohol, allyl acetate, 1-octene, styrene, etc.

In certain applications, and largely dependent on the particular acrylic monomer being utilized, such non-acrylic, polymerizable comonomer(s) may be added to constitute up to about 60%, by weight, of the monomer composition. Preferably, however, the optional non-acrylic comonomer will constitute no more than 50%, by weight, of the monomer composition, and most preferably, it will constitute no more than 30%, by weight, of the monomer composition.

Optionally, the compositions may also contain a minor amount, up to 50%, by weight, of a polymeric thickener, for example, a low or high molecular weight polymer or prepolymer. Illustrative of such polymeric thickeners is a commercially available methacrylate polymer sold by E. I. duPont de Nemours & Company, under the trademark ELVACITE. For example, through inclusion of particular types of modifying polymers, compositions in accordance with the present invention are obtained which provide impact-resistant, high-strength bonds on curing and which therefore are particularly suitable as structural adhesives. The properties of the cured adhesive are largely determined by the selection of the monomers.

In order to further modify the properties of these compositions, they may optionally contain plasticizers such, for example, as dibutyl phthalate or triethylene glycol. Other optional ingredients include, inorganic thickeners, organic and inorganic fillers, cut glass fibers, as well as visible or ultraviolet fluorescent dyes.

The adhesive compositions herein utilize diaryl iodonium salts corresponding to the general formula:

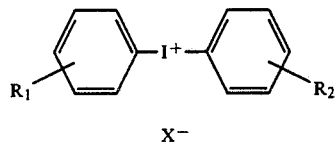

$X^-$

In the above formula, $R_1$ and $R_2$ are hydrogen, $C_1$–$C_{12}$ alkyl, alkenyl, cycloalkyl, cycloalkenyl, aryl, chloro, fluoro, bromo, iodo, carboxy and nitro groups. $X^-$ is a monovalent anion, for example, $F^+$, $Cl^-$, $Br^-$, $I^-$, $NO_3^-$, $HSO_4^-$, $H_2PO_4^-$, $HCOO^-$, $CH_3COO^-$, $BF_4^-$, $AsF_6^-$, $PF_6^-$, and $SbF_6^-$.

Preferred diaryl iodonium salts, for illustrative purposes, include:
Diphenyl iodonium chloride,
Diphenyl iodonium hexafluorophosphate,
Diphenyl iodonium fluoroborate,
Diphenyl iodonium 2-carboxylate, and
3,3'-Dimethyl diphenyl iodonium hexafluorophosphate.

The amount of salt required is an amount effective to initiate polymerization of the monomer. For most applications the amount will range from about 0.1 to 10%, based on the weight of the monomer. The preferred amount will range from about 0.2 to 2%, based on the weight of the monomer. It can be understood that mixtures of diaryl iodonium salts may also be employed herein.

If the dissolving of the initiator in the monomer presents a problem, or if a relatively larger amount of particular initiator is necessary in connection with a monomer in which solubility is difficult, then solvents which dissolve the salt and themselves are soluble in the monomer may be employed. Common solvents for diaryl iodonium salts are described in the literature and include, for example, alkanols such as methanol, ethanol, butanol, substituted and unsubstituted formamides such as formamide and N,N-dimethyl formamide, and water. Methanol and ethanol are the preferred solvents. In most instances, only a minimum amount of solvent is used to dissolve the salt.

The compositions can be formulated with or without a stabilizer compound added to the monomeric composition to prevent or retard the premature decomposition of the iodonium salt initiator. Useful stabilizer compounds are materials classified in the chemical literature as Lewis acids and their salts. They include the stabilizing agents previously described in connection with the stabilizing of the diazonium salts as well as, for example, sulfosalicylic acid, sulfuric acid, toluene sulfonic acid, naphthalene disulfonic acid, naphthalene trisulfonic acid, and the lithium, sodium, and potassium salts of these acids, aluminum chloride, phosphoric acid, alkyl phosphoric acids, alkyl phosphates, etc. When such optional stabilizer compounds are used, they are used in concentrations of from about 0.001 to 1%, by weight, of the total composition. The desirability or necessity of utilizing these stabilizer compounds can easily be recognized by the practitioner in the art.

Optionally, part one of the adhesive system may also contain saccharin. The saccharin component may either be present as saccharin or as the copper salt of saccharin or as a mixture thereof. The saccharin component is generally present in amounts of from 0.01 to 10%, by weight, of the monomer or to the limit of solubility of the materials in the monomer. Preferably, the saccharin component will be present in amounts of 0.1 to 5%, by weight, of the monomer. Other soluble copper (II) salts may be advantageously included in the adhesives herein. For example, copper naphthenate or copper octoate, can be included in an amount of 0.001% to 0.5%, typically 0.02%, by weight, of the monomer. Saccharin, optionally, may be included in the accelerator portion of the adhesive system, preferably in the absence of copper salts.

In order to prepare the first part of the adhesive compositions herein, it is merely necessary to mix the desired amount of diaryl iodonium salt with the selected acrylic monomer or monomers which may optionally contain non-acrylic copolymerizable monomer. Optional ingredients, as mentioned above, are ordinarily included as desired in the first part.

In preparing the aldehyde-amine condensation reaction product, the aldehyde will preferably be an aliphatic aldehyde having 1-12 carbon atoms. Thus aldehydes such as formaldehyde, acetaldehyde, propionaldehyde and butyraldehyde can be used in preparing the condensation product herein. The amines used in the condensation reaction are not critical and may be any primary, or secondary aliphatic or aromatic amine. Thus amines such as ethyl amine, butyl amine, diethyl amine, dipropyl amine, aniline, diphenyl amine and many others are suitable. Useful condensation products can be prepared using a range of proportions of aldehyde to amine, but ordinarily the reactants will be employed with an excess of aldehyde. Useful condensation products are described in U.S. Pat. Nos. 3,591,438 to Toback et al., and 3,616,040 to Toback. Preferred condensation reaction products are the butyraldehyde-aniline and butyraldehyde-butylamine condensation products sold by E. I. duPont de Nemours & Co. under the tradenames "Accelerator 808" and "Accelerator 833", respectively, and the condensation product sold by R. T. Vanderbilt Co. under the tradenames Vanax 808 and Vanax 833.

The monomer component can be applied either to the surface which has been treated with the activator or to the appropriate mating surface to be bonded. The bonding operation is then carried out in a conventional manner by placing the two mating surfaces in abutting relationship and applying a moderate compressive force, if desired, to produce a relatively thin layer of adhesive between the two surfaces. A final adhesive thickness of from 0.01 to 0.15 mm is preferred when using the adhesives of the present invention.

The amount of the activator component employed should be sufficient to ensure efficient initiation of the compositions during curing. Generally, amounts of activator equal to about 0.001 to about 5.0%, by weight, of the acrylic monomer are sufficient and amounts in substantive excess thereof will be unnecessary and may even adversely affect the strength of the final bond. While it is not easy to determine the amount of activator applied to a given surface, adequate results are obtained with a single application by aerosol or otherwise of a thin film of the activator component to at least one of the surfaces to be bonded.

In order to maintain or increase the bond strength of the resultant cured polymer, one may utilize an acrylic monomer having an alcoholic or other relatively polar group substituted thereon. Examples of such polar groups in addition to the hydroxy group include, carboxyl, amino, amido, cyano, mercapto, and halogen polar groups. Hydroxy group containing monomers are preferred. Esters having a labile hydrogen atom or atoms are also desirable. Examples of acrylic monomers within this category include hydroxyethyl acrylate, hydroxypropyl acrylate, hydroxyethyl methacrylate, hydroxypropyl methacrylate, diacetone acrylamide, 2-cyanoethyl acrylate, 3-cyanopropyl acrylate, 2-chloroethyl acrylate, glycerol monomethacrylate, 2-hydroxy-3-chloropropyl methacrylate, etc.

Where the effect of a polar substituted monomer is desired without its actual use, in some instances a small amount (usually no more than 8%, by weight, of the total composition) of an alkanol may be admixed to the composition. Such useful alkanols include, for example, methanol, ethanol, isopropanol, butanol, etc. While analogous mercapto compounds may be used in place of the alkanols with a comparable beneficial effect, their use is not favored mainly because of their unpleasant, strong odor.

The compositions of this invention cure (polymerize or set) at ambient temperatures but heat may be used to accelerate the rate of curing. Compositions containing significant amounts of hydroxy substituted acrylic monomer are further crosslinked by the application of heat resulting in increased bond strength.

The following examples will further describe and illustrate the practice of this invention but they are not intended to limit its scope. In these examples the compositions were prepared by mixing the indicated ingredients in amounts given as parts by weight (pbw) unless otherwise specified. In the examples, the following testing procedures are employed to measure the comparative properties of the various adhesives.

Fixture Time:

The fixture time is measured by adhesively bonding a series of 1" by 3" glass slides. The condensate primer is applied with a cotton swab to at least one inch at the end of one glass slide. A thin coating of the monomer part of the adhesive is applied to at least one inch at the end of another glass slide. The treated surfaces of the two slides are immediately superimposed and the slides are positioned in an aligned relationship with an overlap of one square inch. The fixture time is the earliest time at which the adhesive bond cannot be broken with finger pressure.

Tensile Shear Strength:

The tensile shear strength is measured according to the procedure of ASTM D1002-72 (1973) by first adhesively bonding two steel bars (0.125" by 4" by 0.5") with the test adhesive. The bars are bonded to their 0.5" surface with a 0.5" overlap yielding a bond area of 0.25 square inches. The bonded samples are held in a jig for about 24 hours at room temperature to ensure full curing of the adhesive. The samples are then mechanically pulled apart with an Instron Tensile Tester providing the pulling force set at a speed of 0.01 inches per minute. The desired tensile values at failure are noted in pounds per square inch.

Impact Strength:

The impact strength is measured by first adhesively bonding two steel blocks where the lower block measures 1" by 1¾" and the upper block measures 1" by 1" and following the procedure of ASTM D-950-72 (1973).

EXAMPLES 1-6

These examples illustrate various curable adhesive compositions of the invention and their fixture speed, tensile shear strength on steel and impact strength on steel. The adhesive of Examples 5 and 6 contain no diaryl iodonium salt and are comparative examples not within the invention.

A polyurethane oligomer was first prepared for use as a portion of the monomer base of part one of the adhesive. The polyurethane oligomer was prepared in conventional manner by reacting polypropylene glycol 100 with an excess of toluene diisocyanate. The residual isocyanate end groups were reacted with hydroxyethyl methacrylate (HEMA) and the treated polyurethane oligomer (PUO) was then diluted with HEMA to form a 38% solution of the oligomer and in that form was employed to formulate adhesive compositions as identified below.

|  | EXAMPLE | | | | | |
|---|---|---|---|---|---|---|
|  | 1 | 2 | 3 | 4 | 5 | 6 |
| PUO diluted with HEMA | 40 | 40 | 40 | 40 | 40 | 40 |
| Hydroxyethyl Methacrylate | 20 | 20 | 20 | 20 | 20 | 20 |
| Methacrylic acid | 1.8 | 1.8 | 1.8 | 1.8 | 1.8 | 1.8 |
| Saccharin | 0.8 | 0.8 | 0.8 | 0.8 | 0.8 | 0.8 |
| Na₄ EDTA* | 0.1 | 0.1 | 0.1 | 0.1 | 0.1 | 0.1 |
| Diphenyl Iodonium Chloride | 0.63 | — | — | — | — | — |
| Diphenyl Iodonium 2-Carboxylate | — | 0.63 | 1.26 | — | — | — |
| Diphenyl Iodonium Hexafluoro Phosphate | — | — | — | 0.63 | — | — |
| Cumene Hydroperoxide | — | — | — | — | 0.63 | — |

*Sodium ethylene diamine tetraacetic acid.

The fixture time of each of the adhesive monomer bases was determined following the Fixture Time Test procedure described above employing a 30% solution of Vanax 808 in 1,1,1-trichloroethane. The "fixture time" (i.e. the time required to prevent movement of the two substrates by hand) was then determined and recorded as shown in Table I. The tests were repeated using adhesive (monomer base) that was subjected to accelerated aging by heating at 50° C. for 10 days.

TABLE I

| | Fixture Time | |
|---|---|---|
| Example # | Fresh | Aged |
| 1 | 1.75 min. | 2.75 min. |
| 2 | 3.0 min. | 3.0 min. |
| 3 | 2.5 min. | 2.5 min. |
| 4 | 7.0 min. | 7.0 min. |
| 5 | 7.0 min. | 6.5 min. |
| 6 | 10.0 min. | 10.0 min. |

The above results indicate that adhesives of the invention employing diphenyl iodonium salts do not significantly lose curing speed on aging.

The comparative strengths of the adhesive bonds employing a 30% solution of Vanax 808 in 1,1,1-trichloroethane as the second part was obtained by the Tensile Shear and Impact Strength Tests and the results are given in Table II.

TABLE II

| Adhesive of Example # | Tensile Shear Strength on Steel* | Impact Strength On Steel** |
|---|---|---|
| 1 | 1,200 | 6.4 |
| 2 | Not tested | 6.4 |
| 3 | 3,200 | 3.9 |
| 4 | 2,480 | 7.7 |
| 5 | 2,400 | 7.7 |
| 6 | 0 | 0.63 |

*pounds per square inch
**foot-pounds

The above results show the adhesives of the invention to exhibit a tensile shear and impact strength about comparable to an adhesive employing cumene hydroperoxide of the prior art.

EXAMPLES 7-9

Additional adhesive formulations were prepared for evaluations of fixture time, impact strength and tensile shear strength. The formulations are summarized below.

|  | EXAMPLE | | |
|---|---|---|---|
|  | #7* | #8 | #9 |
| PUO diluted with HEMA** | 36.7 | 36.7 | 36.7 |
| Hydroxyethyl Methacrylate | 55.0 | 55.0 | 55.0 |
| Methacrylic Acid | 6.0 | 6.0 | 6.0 |
| Saccharin | 2.0 | 2.0 | 2.0 |
| Cyanoacetic Acid | 0.3 | 0.3 | 0.3 |
| Na₄ EDTA | 0.01 | 0.01 | 0.01 |
| Diphenyl Iodonium Chloride | — | 0.6 | — |
| Diphenyl Iodonium 2-Carboxylate | — | — | 2.0 |

*Example 7 is a control containing no initiator.
**The PUO (polyurethane oligomer) was prepared as in Examples 1-6, but was diluted with HEMA to form a 40% solution of the oligomer.

Fixture Time testing results are given in Table III.

TABLE III

| Adhesive of | Fresh | | Fixture Time Aged* | |
|---|---|---|---|---|
| Example # | Vanax 808 | Vanax 833 | Vanax 808 | Vanax 833 |
| 7 | 8 min | 12 min | Not tested | Not tested |
| 8 | 40–50 sec | 70–80 sec | 45–55 sec | 80–90 sec |
| 9 | 40–50 sec | 70–80 sec | 40–50 sec | 80–90 sec |

*Monomeric part aged for 10 days at 50° C.

EXAMPLE 10

This example demonstrates the excellent impact and tensile strength of the cured adhesives of Example Nos.

8 and 9 compared to Example No. 7 employing no initiator. The activator employed was Vanax 808, 20% solution in 1,1,1-trichloroethane. The bonds were tested after 24 hours.

| Adhesive of Example # | Tensile Shear Strength* | Impact Strength** |
|---|---|---|
| 7 (control) | 80 | 0.5 |
| 8 | 2,655 | 5.0 |
| 9 | 2,300 | 5.2 |

*pounds per square inch
**foot-pounds

EXAMPLE 11

This example demonstrates the relationship between the concentration of Vanax 808 primer and the strength of the resultant bonds. The adhesive monomer formulation of Example 8 was used in combination with increasing amounts of Vanax 808. Corresponding bonds strengths were determined as given below.

| Concentration of Vanax 808 in 1,1,1-trichloroethane | Tensile Shear Strength* | Impact Strength** |
|---|---|---|
| 10% | 2,080 | 4.3 |
| 20% | 2,655 | 5.0 |
| 30% | 2,105 | 7.5 |
| 40% | 1,733 | 5.5 |

*pounds per square inch
**foot-pounds

Variations may be made in ingredients, proportions and procedures without departing from the scope of the invention as defined by the following claims.

What is claimed is:

1. An anaerobic curing adhesive composition comprising in combination (a) a first part comprising free radical polymerizable acrylic or substituted acrylic monomer(s) and diaryl iodonium salt in an amount sufficient to intiate polymerization of said monomer(s), and in contact therewith (b) a second part activator comprising an aldehyde-amine condensation product, wherein the acrylic or substituted acrylic monomer of the first part is a member of the group consisting of compounds of the formula:

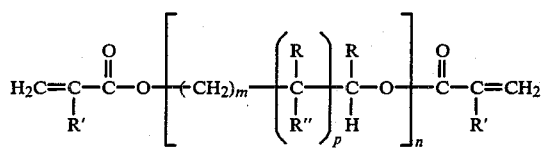

(a)

wherein

R is selected from the group consisting of hydrogen methyl, ethyl,

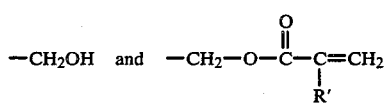

R' is selected from the group consisting of hydrogen, chlorine, methyl, and ethyl, R" is selected from the group consisting of hydrogen, hydroxy, and

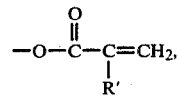

m is an integer from 1 to 8,
n is an integer from 1 to 20, and p is 0 or 1;

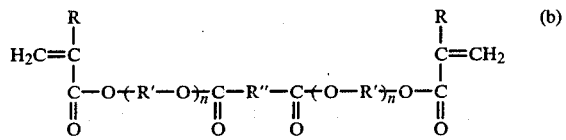

(b)

wherein

R represents hydrogen, chlorine, methyl or ethyl,

R' represents alkylene with 2–6 carbon atoms, R' represents $(CH_2)_m$ in which m is an integer of from 0 to 8,

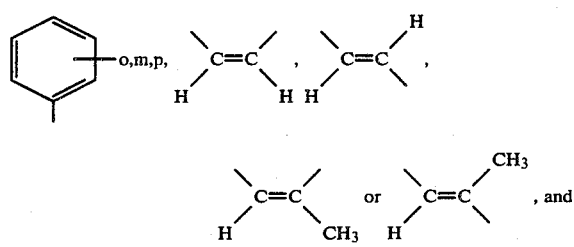

n represents an integer of from 1 to 4;

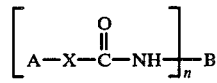

(c)

wherein

X is selected from the group consisting of

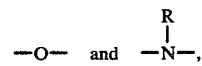

and

R is a member selected from the group consisting of hydrogen and lower alkyl of 1 to 7 carbon atoms;

A represents the organic residue of an active hydrogen containing acrylic ester wherein the active hydrogen has been removed, the ester being hydroxy or amino substituted on the alkyl portion thereof and the methyl, ethyl and chlorine homologs thereof;

n is an integer from 1 to 6 inclusive; and

B is a mono- or polyvalent organic radical selected from the group consisting of alkyl, alkylene, alkenyl, cycloalkyl, cycloalkylene, aryl, aralkyl, alkaryl, poly(oxyalkylene), poly (carboalkoxyalkylene), and heterocyclic radicals both substituted and unsubstituted;

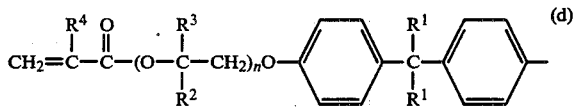

(d)

-continued $$-O-(CH_2-\underset{\underset{R^2}{|}}{\overset{\overset{R^3}{|}}{C}}-O)_n\overset{\overset{O}{\|}}{C}-\underset{\underset{}{|}}{\overset{\overset{R^4}{|}}{C}}=CH_2 \quad (5)$$

where
$R^1$ is methyl, ethyl, carboxyl or hydrogen;
$R^2$ is hydrogen, methyl or ethyl;
$R^3$ is hydrogen, methyl or hydroxyl;
$R^4$ is hydrogen, chlorine, methyl or ethyl and
n is an integer of from 0 to 8; and
(e) monofunctional acrylate and methacrylate esters and the hydroxy, amide, cyano, chloro, and silane substituted derivatives thereof.

2. The adhesive composition of claim 1 wherein the diaryl iodonium salt is a salt of the formula

[structure: diaryl iodonium with $R_1$, $R_2$, $X^-$]

wherein
$R_1$ and $R_2$ are hydrogen, $C_1$-$C_{12}$ alkyl, alkenyl, cycloalkyl, cycloalkenyl, aryl, chloro, fluoro, bromo, iodo, carboxy and nitro groups; and $X^-$ is $F^-$, $Cl^-$, $Br^-$, $I^-$, $NO_3^-$, $HSO_4^-$, $H_2PO_4^-$, $HCOO^-$, $CH_3COO^-$, $BF_4^-$, $AsF_6^-$, $PF_6^-$, and $SbF_6^-$.

3. The adhesive composition of claim 1 wherein the diaryl iodonium salt is present in an amount from about 0.1 to 10% based on the weight of the monomer(s).

4. The adhesive composition of claim 1 wherein the acrylic or substituted acrylic monomer comprises hydroxyethyl methacrylate.

5. The adhesive composition of claim 1 wherein the acrylic or substituted acrylic monomer further comprises a polyurethane oligomer.

6. The adhesive composition of claim 1 wherein the acrylic or substituted acrylic monomer comprises poly(butylene maleate) dimethacrylate or poly(propylene glycol) dimethacrylate.

7. The adhesive composition of claim 1 wherein the activator comprises the reaction product of butyraldehyde and butylamine or butyraldehyde and aniline.

8. The adhesive composition of claim 1 wherein the diaryl iodonium salt is diphenyl iodonium chloride.

9. The adhesive composition of claim 1 wherein the diaryl iodonium salt is diphenyl iodonium 2-carboxylate.

10. The adhesive composition of claim 1 wherein the diaryl iodonium salt is diphenyl iodonium fluoroborate.

11. The adhesive composition of claim 1 wherein the diaryl iodonium salt is diphenyl iodonium hexafluorophosphate.

12. The adhesive composition of claim 1 wherein the diaryl iodonium salt is 3,3'dimethyldiphenyl iodonium hexafluorophosphate.

13. An article bonded with an adhesive composition comprising in combination (a) a first part comprising free radical polymerizable acrylic or substituted acrylic monomer(s) and diaryl iodonium salt in an amount sufficient to initiate polymerization of said monomer(s), and in contact therewith (b) a second part activator comprising an aldehyde-amine condensation product, wherein the diaryl iodonium salt corresponds to the formula

[structure: diaryl iodonium with $R_1$, $R_2$, $X^-$]

wherein
$R_1$ and $R_2$ are hydrogen, $C_1$-$C_{12}$ alkyl, alkenyl, cycloakyl, cycloalkenyl, aryl, chloro, fluoro, bromo, iodo, carboxy and nitro groups; and $X^-$ is $F^-$, $Cl^-$, $Br^-$, $I^-$, $NO_3^-$, $HSO_4^-$, $H_2PO_4^-$, $HCOO^-$, $CH_3COO^-$, $BF_4^-$, $AsF_6^-$, $PF_6^-$, and $SbF_6^-$, and wherein the acrylic or substituted acrylic monomer of the first part is a member of the group consisting of compounds of the formula:

$$H_2C=C-\overset{\overset{O}{\|}}{C}-O-(CH_2)_m-\left[\left(\underset{\underset{R''}{|}}{\overset{\overset{R}{|}}{C}}-\underset{\underset{H}{|}}{\overset{\overset{R}{|}}{C}}\right)_p-O\right]_n-\overset{\overset{O}{\|}}{C}-C=CH_2 \quad (a)$$
$\quad R' \qquad\qquad\qquad\qquad\qquad\qquad R'$ wherein
R is selected from the group consisting of hydrogen methyl, ethyl, $$-CH_2OH \quad \text{and} \quad -CH_2-O-\overset{\overset{O}{\|}}{C}-\underset{\underset{R'}{|}}{C}=CH_2$$

R' is selected from the group consisting of hydrogen, chlorine, methyl and ethyl,
R is selected from the group consisting of hydrogen, hydroxy, and $$-O-\overset{\overset{O}{\|}}{C}-\underset{\underset{R'}{|}}{C}=CH_2,$$

m is an integer from 1 to 8,
n is an integer from 1 to 20, and p is 0 or 1;

$$H_2C=\underset{\underset{O}{\|}}{\overset{\overset{R}{|}}{C}}\underset{\underset{O}{\|}}{\overset{\overset{}{|}}{C}}-O-(R'-O)_{\overline{n}}\overset{\overset{}{\|}}{C}-R''-\overset{\overset{}{\|}}{C}-(O-R')_{\overline{n}}O-\underset{\underset{O}{\|}}{\overset{\overset{R}{|}}{C}}=CH_2 \quad (b)$$

wherein
R represents hydrogen, chlorine, methyl or ethyl,
R' represents alkylene with 2-6 carbon atoms,
R" represents $(CH_2)_m$ in which m is an integer from 0 to 8,

[structures: phenyl with o,m,p substituents; C=C with H substituents]

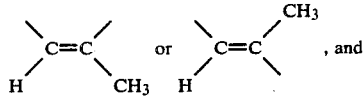

n represents an integer of from 1 to 4;

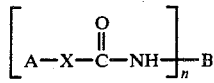 (c)

wherein
X is selected from the group consisting of

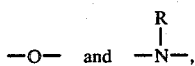

and
R is a member selected from the group consisting of hydrogen and lower alkyl of 1 to 7 carbon atoms;
A represents the organic residue of an active hydrogen containing acrylic ester wherein the active hydrogen has been removed, the ester being hydroxy or amino substituted on the alkyl portion thereof and the methyl, ethyl and chlorine homologs thereof;
n is an integer from 1 to 6 inclusive; and
B is a mono- or polyvalent organic radical selected from the group consisting of alkyl, alkylene, alkenyl, cycloalkyl, cycloakylene, aryl, aralkyl, alkaryl, poly(oxyalkylene), poly(carboalkoxyalkylene), and heterocyclic radicals both substituted and unsubstituted;

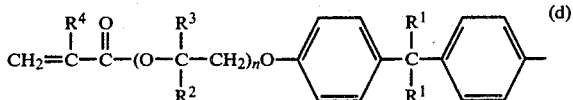 (d)

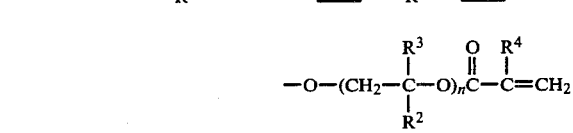

where
$R^1$ is methyl, ethyl, carboxyl or hydrogen;
$R^2$ is hydrogen, methyl or ethyl;
$R^3$ is hydrogen, methyl or hydroxyl;
$R^4$ is hydrogen, chlorine, methyl or ethyl and
n is an integer of from 0 to 8; and
(e) monofunctional acrylate and methacrylate esters and the hydroxy, amide, cyano, chloro, and silane substituted derivatives thereof.

14. The article of claim 13 wherein the acrylic or substituted acrylic monomer comprises hydroxyethyl methacrylate and further comprises a polyurethane oligomer.

15. The article of claim 13 wherein the diaryl iodonium salt is diphenyl iodonium chloride or diphenyl iodonium 2-carboxylate.

* * * * *